United States Patent
Somers et al.

[11] Patent Number: 6,140,604
[45] Date of Patent: Oct. 31, 2000

[54] LASER DRILLING BREAKTHROUGH DETECTOR

[75] Inventors: Ralph M. Somers, Cincinnati; John M. Crow, Morrow, both of Ohio

[73] Assignee: General Electric Company, Cincinnati, Ohio

[21] Appl. No.: 09/099,755

[22] Filed: Jun. 18, 1998

[51] Int. Cl.[7] ................................. B23K 26/38
[52] U.S. Cl. ................... 219/121.71; 219/121.7
[58] Field of Search ........................ 219/121.7, 121.71, 219/121.81, 121.83

[56] References Cited

U.S. PATENT DOCUMENTS

| | | | |
|---|---|---|---|
| 4,633,058 | 12/1986 | Jones | 219/121.7 |
| 5,026,964 | 6/1991 | Somers et al. | 219/121.7 |
| 5,063,280 | 11/1991 | Inagawa et al. | 219/121.7 |

FOREIGN PATENT DOCUMENTS

| | | |
|---|---|---|
| 3-124387 | 5/1991 | Japan . |
| 3-174993 | 7/1991 | Japan . |
| 2 241 779 | 11/1991 | United Kingdom . |

*Primary Examiner*—Geoffrey S. Evans
*Attorney, Agent, or Firm*—Andrew C. Hess; Gerry S. Gressel

[57] ABSTRACT

In a pulse laser drilling process having a machine control for controlling a laser, an apparatus is provided to detect when a hole is drilled through a workpiece. The apparatus detects a laser pulse, where the laser pulse emits a laser light upon drilling impact with the workpiece. A second detection step detects sparks emitted by the workpiece, and a spark signal amplitude representative thereof is produced. The sparks produce visible wavelength light. A filter blocks the laser light and transmits the visible wavelength light. A photosensor associated with the filter senses when the spark signal amplitude diminishes below a predetermined threshold level. An output signal, responsive to the photosensor indicates when a through hole is complete and indicates to the machine control to stop any further laser pulse.

11 Claims, 2 Drawing Sheets

LASER DRILLING BREAKTHROUGH DETECTOR

TECHNICAL FIELD

The present invention relates to laser drilled holes and, more particularly, to a system and method for detecting when a pulse laser drill has drilled through a workpiece.

BACKGROUND OF THE INVENTION

Laser drilling of aircraft parts uses a high energy laser beam to remove material from the part, leaving a hole of a controlled diameter. If the part has a closed cavity, as is typical in airfoil blades, the energy beam must drill through the first surface but must be turned off before it strikes the second surface. The first surface penetration is called breakthrough, and while breakthrough is required, the energy beam must be turned off before damage to the second surface occurs.

Typically, a machine control is programmed to control the number of laser pulses or shots. Due to variations inherent in the manufacture of undrilled parts, such as wall thickness variation caused by casting changes or other features, the thickness of metal walls in parts is not always constant. Hence, the pre-programmed number of shots to break through the surface may be too few (leading to incomplete holes) or too many (leading to material scarring in the second surface). An underdrilled hole requires redrilling of the part, and an overdrilled hole results in added expense for material evaluation, reinspection, and sometimes part scrapping.

Various prior art methods have been developed for detecting a breakthrough condition before damage to the second surface occurs. For example, the workpiece may be viewed from the front or beam side with a radiation sensing system. However, in the operation of a pulse laser drill, the laser pulse beam striking the material to be drilled results in the production of very high temperatures by intense local heating in as much as laser drilling is a thermal process. The intense local heating causes very hot minute particles of material to be expelled from the localized drilling area. The heated minute particles, in the form of a plume of sparks, radiate heat and light, i.e., extrinsic radiation. When a radiation sensing system looking for intrinsic laser pulse radiation is used to determine if a hole is completely through, the extrinsic radiation from the hot minute particles causes false readings in the radiation system.

U.S. Pat. No. . 5,026,964, totally incorporated herein by reference, solves for the above-mentioned radiation sensing problem by providing a detection method capable of discriminating between intrinsic radiation and extrinsic radiation. However, the apparatus of the '964 patent uses a manually adjustable threshold that has to be individually set up for different laser voltages.

It is an object of the present invention to provide a method and apparatus for detecting when a through bore is drilled in a workpiece, without requiring manual adjustment for different laser voltages.

It is a further object of the present invention to provide such a method and apparatus which prevents further drilling once a through bore is drilled in the workpiece.

It is yet another object of the present invention which prevents underdrilling in a pulse laser drilling operation.

SUMMARY OF THE INVENTION

The present invention provides for an apparatus and method for detecting when a through hole is drilled in a workpiece. The present invention achieves pulse discrimination using an optical filter which blocks or absorbs the light from the drilling laser while transmitting the visible wavelengths from the sparks produced during drilling.

In accordance with one aspect of the present invention, a photosensor is used to observe the sparks from the material being drilled. The photosensor looks through the drilling lens, so the material being drilled is never blocking the view of the sparks. Based on the intensity of the spark signals, laser drilling can be stopped concurrently with completion of a through hole.

In the drawings as hereinafter described, a preferred embodiment is depicted; however, various other modifications and alternative constructions can be made thereto without departing from the true spirit and scope of the invention.

BRIEF DESCRIPTION OF THE DRAWING

The novel features of the invention are set forth with particularity in the appended claims. The invention itself, however, both as to organization and method of operation, together with objects and advantages thereof, may best be understood by reference to the following description taken in conjunction with the accompanying drawing in which:

DETAILED DESCRIPTION OF THE INVENTION

Figure 1A:
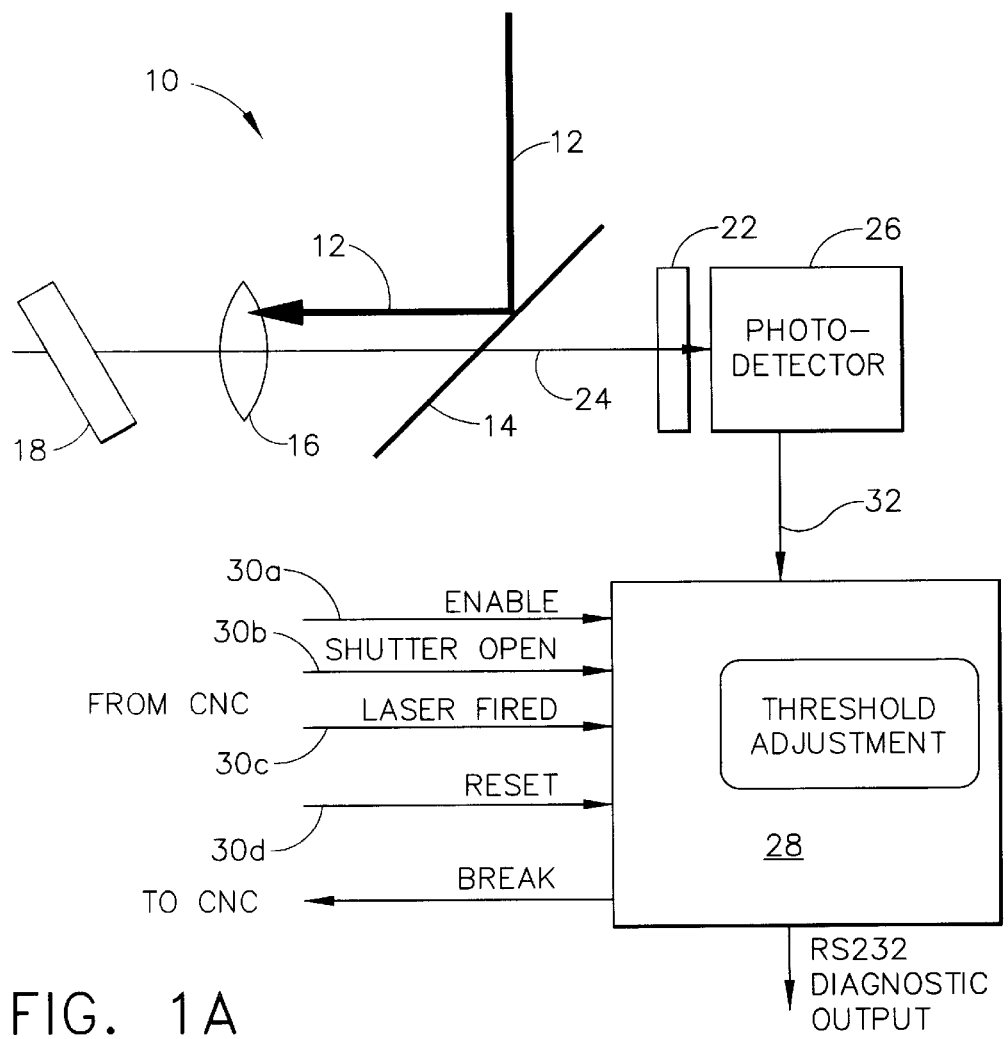
FIG. 1A illustrates a schematic block diagram of the laser drilling breakthrough detector apparatus and method, according to the present invention.

FIG. 1A illustrates a schematic block diagram 10 of a laser drilling breakthrough detector apparatus and method, according to the present invention. A high energy pulsed laser light 12 is detected by a dichroic mirror 14 and reflected through drill lens 16 to drill the surface of material 18. The laser breakthrough sensor apparatus 10 senses sparks emitted by part 18 being drilled, and senses when spark signal amplitude 19, or intensity, diminishes below a pre-set value.

Figure 1B:
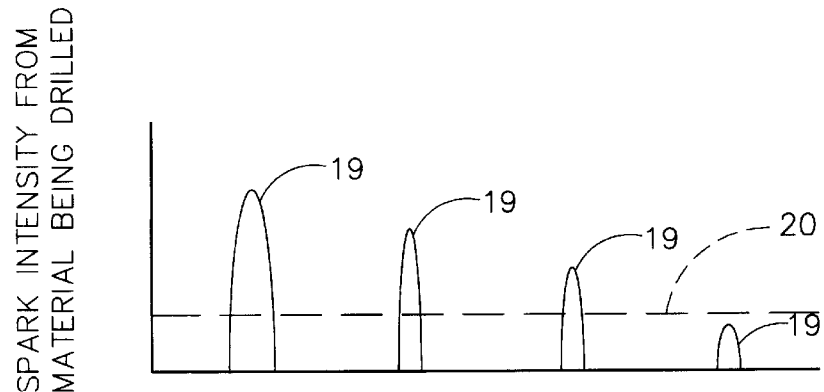
FIG. 1B is a graphical representation of spark intensity from the material being drilled.

The spark intensity 19 from material 18 is illustrated in FIG. 1B, where the threshold level is shown as line 20. The drop in spark intensity below threshold 20 signals a breakthrough condition on material 18. If the laser pulse train 12 is stopped at this point (indicated in FIG. 1B as being just after drilling pulse D4) a through hole results in material 18, without damage to a second surface.

In accordance with a preferred embodiment of the present invention, an optical filter 22 blocks or absorbs light from the drilling laser 12 while transmitting visible wavelengths, indicated by line 24, from the sparks produced during drilling. Photosensor 26 detects through the drilling lens 16 so the material 18 being drilled cannot block the view of the sparks. The intensity of the signal at photosensor 26 is largest for the first drilling pulse, indicated as D1, and decreases until the laser beam has drilled though the workpiece 14 or the first surface of an airfoil part. At this point, the spark emission is reduced and the hole is "through" or "broken through". If the drilling were to continue on a first surface, for example an airfoil part with an internal cavity, damage would occur at the second surface, an undesirable condition.

By adjusting the threshold voltage 20 in control circuitry 28, a user can control at what point the drilling process will stop. When the signal amplitude (for example, D4) is lower than the threshold setting 20, sensor circuit 28 sends a "break" signal to a CNC control (computer numerical control) on the laser machine, which stops the firing sequence.

The present invention discloses a novel use of a spectral filter 22 to remove the strong light from the drilling laser 12. The function of the spectral filter is to remove the longer (laser) wavelength light while passing the visible wavelength light. It will be obvious to those skilled in the art that, optically, this can be accomplished by absorption or by reflection. For purposes of illustration only, the spectral filter 22 comprises an absorbing filter glass, although other implementations may be applied. For example, the filtering may be achieved by a dielectric coated filter which reflects the laser wavelength, or by any suitable, commercially available filter that uses absorption, reflection and interference.

In accordance with the present invention, the use of spectral filter 22 greatly improves the discrimination between the drilling (sparks) and through (no sparks) conditions by reducing the unwanted background light from the laser beam 12. Furthermore, the present invention uses a peak detector circuit 28 with the first pulse peak amplitude D1 used to set a reference level for an operational threshold inside the microcontroller. The operational threshold inside the microcontroller has a fixed percentage value that can be set either by a manually operated switch or by remotely set control signal bits from a laser CNC. The operational threshold also includes the peak amplitude of the highest spark signal. Percentage level 28a is set prior to firing the laser. Thus, the operational threshold level 20 is a product of the D1 spark intensity and the threshold percentage setting 28a.

This permits the sensor 10 to track the changes in signal intensity caused by changing the laser operating voltage or by changes on other elements of the detection chain. The laser drilling process controls hole size by a combination of operating voltage on the flashlamps, part-to-lens distance (focus position) and average energy level. The operating voltage as controlled by the CNC can be adjusted as needed, and the initial spark intensity follows from the operating voltage changes. This adjustable threshold level allows the voltage to be adjusted accordingly for changes in the laser operating conditions controlled by the CNC part program, indicated by input commands 30a, 30b, 30c, and 30d, to the peak detector circuit 28, or by variations in the CNC controlled laser drilling machine (which undergoes normal changes in output energy due to aging of the flashlamps or due to degradation of the optical or electrical components in the laser drilling machine) or sensor 10, as indicated by spark signal input 32.

The photosensor 26 used to observe the sparks from the metal 18 may be any suitable sensor or detector, such as a photodiode, a phototransistor, or other photosensor technology such as germanium or lead sulfide which are less sensitive at the visible wavelengths. In a preferred embodiment of the present invention, photosensor 26 comprises a photodiode, such as a silicon photodiode, placed behind a mirror 14 that transmits part of the visible light but reflects a very high percentage of the 1.06 micrometer wavelength light from the drilling laser. Because of the high power of the laser beam and the much lower intensity of the spark emission, the photosensor 26 is dominated by the unwanted light from the laser beam. In a preferred embodiment of the present invention, an infrared absorbing filter 22 is used, having a 3 mm thickness of Schott type KG3 filter glass. This material is commercially available and normally sold as heat absorbing glass for use in projectors, etc. The filter glass transmits approximately 0.001 percent of the infrared light while transmitting 50 to 80 percent of the visible light from the sparks. The result is a very high discrimination between the drilling or spark emission state and the through or no-spark state.

Since the photosensor 26 can see the light through the same lens 16 and optical elements used to drill the part 18, previous problems caused by the part being drilled obscuring the view of the photosensor have been eliminated. If the part can be drilled, the spark emissions can be detected.

Figure 2:
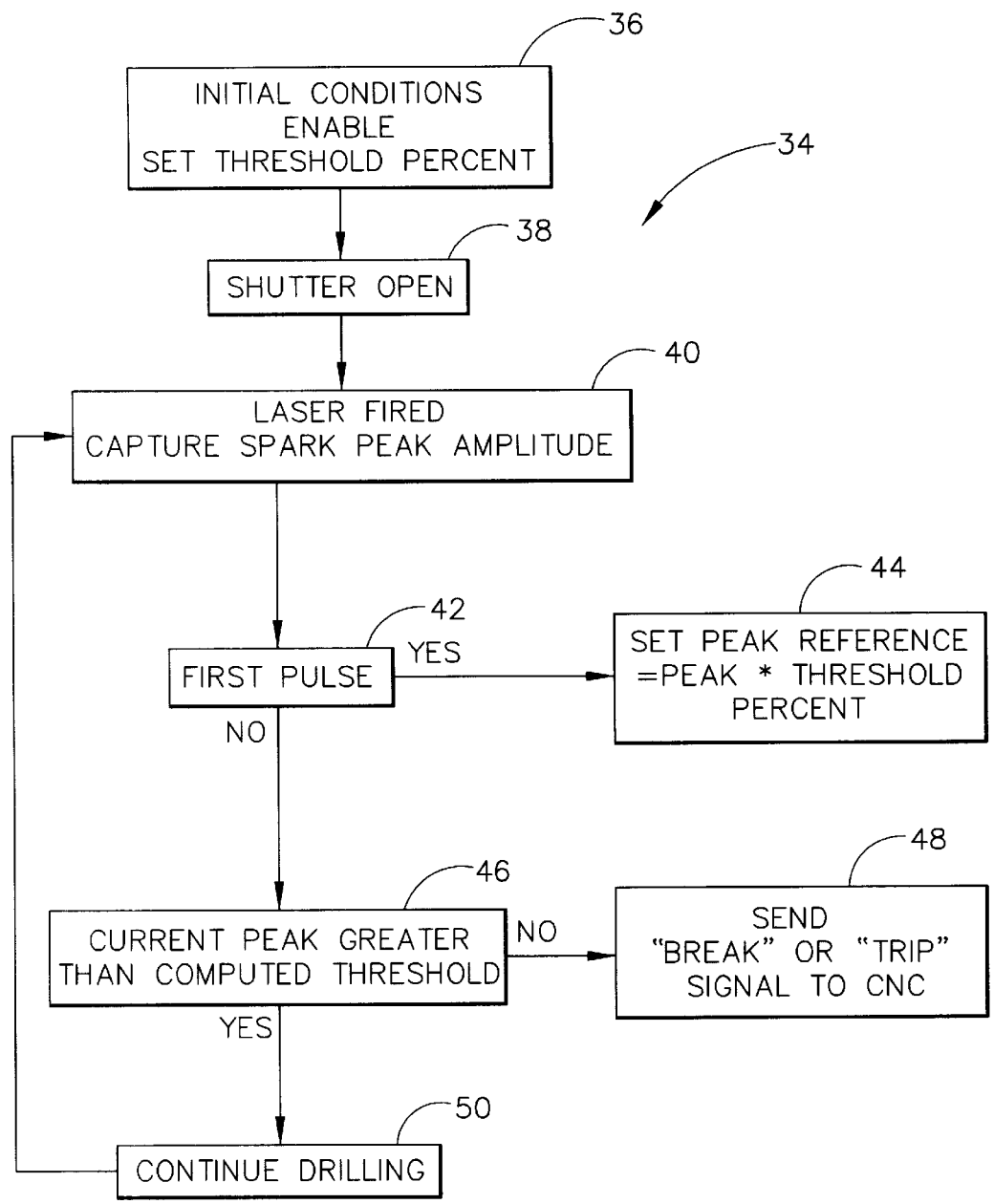
FIG. 2 is a flow chart diagram illustrating the steps for making the laser breakthrough determination in accordance with the present invention.

Referring now to FIG. 2, the signal detection and control steps for achieving the laser drilling breakthrough detection are illustrated in flow chart 34. In step 36, initial conditions are set, the system is enabled, and a threshold percent is set. The laser firing sequence for drilling comprises firing the laser and then opening the control shutter for a programmed number of shots (while between programmed shots, the shutter is closed). While the flow diagram of FIG. 2 pertains to drilling a single hole, that is not to be considered as limiting the invention. Even without including a "shutter closed" step, it will be obvious to those skilled in the art that the shutter will be closed while the CNC is moving the part to the next drilling position. Otherwise, random unplanned holes would be drilled into the part.

The laser shutter has several functions. When it is closed, the laser power resonator is still operating to maintain consistent operating conditions on the laser rod. When the part program calls for laser energy to be delivered to the part to make a hole, the shutter has to open (in the interval between pulses) and stay open for the programmed number of pulses (laser shots). In order to respond only to laser pulses delivered to the part and hence ones that can produce a spark emission, the sensor only looks for a response after the shutter is open. Thus, the "shutter open" signal line of block 38 tells the sensor to start looking at the response from the photosensor. The combination of the laser firing input of block 40 and the shutter open input of block 38 activates the breakthrough sensor whenever it is enabled by a control line from the CNC. That is, if the first pulse has been fired, as determined at block 42, then the peak reference is set at block 44; if the first pulse has not been fired, the sequence moves to step 46, to determine if the current peak is greater than the computed threshold. If not, the "break" signal is sent to the CNC at block 48; if so, drilling continues at block 50. Drilling continues until the completion of a desired through hole.

Since the high voltage power supply that supplies the flashlamp energy is pulsed, the power supply controller sends a verification to the CNC or other laser machine controller that the laser has been fired. At the end of this laser fired signal pulse, the sensor circuit reads the peak photosensor 26 voltage and continues with the algorithm.

The first spark pulse amplitude D1 is typically larger than the subsequent spark signals. If the amplitude does increase, as long as the last pulse is lower than the first, the method of the present invention, as detailed in flow chart 34 of FIG. 2, applies. The first firing pulse at step 42 following the shutter opening of step 38 sets the peak reference level at step 44, against which all following pulses are compared. The reference level is a selectable percentage of the first peak amplitude. This way the circuit 28 can track changes in response or changes in the laser pulse energy.

Thus, in accordance with the present invention, laser drilling is halted con-currently with completion of a through hole. The present invention looks at the sparks emitted by the part being drilled and senses when the spark signal amplitude diminishes below a threshold level. The drop in spark intensity signals a breakthrough condition, indicating that the laser should stop firing. The present invention overcomes the previous problems of overdrilling and underdrilling with laser drilling, and as is apparent to one of ordinary skill in the art, provides an apparatus and method to detect when a through bore is drilled in a workpiece.

While the principles of the invention have now been made clear in an illustrative embodiment, there will become obvious to those skilled in the art many modifications in structure, arrangement, and components used in the practice of the invention and otherwise which are particularly adapted for specific operating requirements without departing from those principles. The appended claims are therefore intended to cover and embrace any such modifications, within the limits only of the true spirit and scope of the invention.

What is desired to be secured by Letters Patent is the invention as defined in the following claims:

1. A method for detecting when a hole has been drilled though a workpiece with a pulse laser drilling process, the method comprising the steps of:

(a) detecting a laser pulse;

(b) computing an operational threshold which is a function of a measured spark signal amplitude of the laser pulse;

(c) detecting sparks during subsequent laser pulses and producing a spark signal amplitude representative thereof;

(d) comparing the spark signal amplitudes of subsequent laser pulses to the operational threshold to determine when a through hole is achieved.

2. A method for detecting when a hole has been drilled though a workpiece with a pulse laser drilling process, the method comprising the steps of:

(a) providing a threshold percent;

(b) directing a laser pulse to the workpiece;

(c) measuring a spark peak amplitude of the laser pulse;

(d) computing an operational threshold which is a function of the spark peak amplitude and the threshold percent;

(e) directing a subsequent laser pulse to the workpiece to form the hole;

(f) measuring a spark peak amplitude of the subsequent laser pulse;

(g) comparing the spark peak amplitude of the subsequent laser pulse to the operational threshold;

(h) repeating steps (e) through (g) until the operational threshold is greater than the spark peak amplitude.

3. The method recited in claim 2 further comprising the step of generating an output signal to a machine control when the operational threshold is greater than the spark peak amplitude to prevent further laser drilling associated with the hole.

4. An apparatus for detecting when a hole is drilled through a workpiece by a pulse laser under machine control, the apparatus comprising:

a detecting means for detecting sparks emitted by the workpiece during laser drilling and producing a spark signal amplitude representative thereof, the sparks producing a visible wavelength light;

an evaluating means effective for comparing said spark signal amplitude of said detecting means to a operational threshold which is a function of a measured spark intensity; and an output signal means responsive to the evaluating means for indicating when the through hole is achieved and for indicating to the machine control to stop any further laser pulse to the workpiece.

5. The apparatus of claim 4 further comprising means for improving discrimination between the laser wavelength light emitted upon drilling impact with the workpiece and the visible wavelength light produced from the sparks.

6. The apparatus of claim 5 wherein the detecting means comprises a photosensor.

7. The apparatus as claimed in claim 5 wherein the means for improving discrimination comprises a spectral filter for removing the laser wavelength light.

8. The apparatus of claim 7 wherein the means for improving discrimination further comprises a spectral filter for passing the visible wavelength light.

9. The apparatus of claim 4 wherein the detecting means observes the sparks through a drilling lens.

10. The apparatus of claim 4 wherein the evaluating means comprises a peak detector circuit to set a reference level for the operational threshold.

11. The apparatus of claim 10 wherein the peak detector circuit comprises measuring a first pulse peak spark amplitude of the hole drilling impact to set a reference level for the operational threshold inside a microcontroller.

* * * * *